United States Patent
Nayak et al.

(10) Patent No.: US 12,332,848 B1
(45) Date of Patent: *Jun. 17, 2025

(54) AUTOMATED COLLABORATION

(71) Applicant: Google LLC, Mountain View, CA (US)

(72) Inventors: Priya Nayak, San Francisco, CA (US); James Watts, New York, NY (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/241,010

(22) Filed: Aug. 31, 2023

Related U.S. Application Data

(63) Continuation of application No. 17/723,447, filed on Apr. 18, 2022, now Pat. No. 11,748,311, which is a
(Continued)

(51) Int. Cl.
*G06F 16/176* (2019.01)
*G06F 40/166* (2020.01)
(Continued)

(52) U.S. Cl.
CPC .......... *G06F 16/176* (2019.01); *G06F 40/166* (2020.01); *G06F 40/194* (2020.01);
(Continued)

(58) Field of Classification Search
CPC . H04L 12/1818; G06F 16/176; G06F 40/166; G06F 40/194; G06Q 10/101
(Continued)

(56) References Cited

U.S. PATENT DOCUMENTS 5,280,367 A    1/1994  Zuniga
5,448,695 A    9/1995  Douglas et al.
(Continued)

FOREIGN PATENT DOCUMENTS

WO   2012057726 A1   5/2012
WO   2014072767 A1   5/2014

OTHER PUBLICATIONS

"Series H: Audiovisual and Multimedia Systems; Infrastructure of audiovisual services—Coding of moving video; Advanced video coding for generic audiovisual services". H.264. Version 1. International Telecommunication Union. Dated May 2003, 282 pgs.
(Continued)

*Primary Examiner* — Joseph L Greene
(74) *Attorney, Agent, or Firm* — Lowenstein Sandler LLP

(57) ABSTRACT

A method for suggesting collaboration between a plurality of users of a communication system includes identifying a first document pertaining to a first event associated with a first user, determining that collaboration is allowed for the first document, identifying a second document having a collaborative similarity with the first document and pertaining to a second event and associated with a second user, generating a collaboration suggestion for collaboration between the first user and the second user with respect to the first event, providing the collaboration suggestion to collaborate with respect to the first event on a user device of the first user, receiving an indication of an acceptance, by the first user, of the collaboration suggestion, and causing a collaboration session to be established between the user device of the first user and a user device of the second user to collaborate with respect to the first event.

20 Claims, 6 Drawing Sheets

Related U.S. Application Data continuation of application No. 16/149,458, filed on Oct. 2, 2018, now Pat. No. 11,308,037, which is a continuation of application No. 13/663,750, filed on Oct. 30, 2012, now abandoned.

(51) Int. Cl.
  *G06F 40/194* (2020.01)
  *G06F 40/197* (2020.01)
  *G06Q 10/101* (2023.01)
  *H04L 12/18* (2006.01)

(52) U.S. Cl.
  CPC ......... *G06F 40/197* (2020.01); *G06Q 10/101* (2013.01); *H04L 12/1818* (2013.01)

(58) Field of Classification Search
  USPC ....................................................... 709/204
  See application file for complete search history.

(56) References Cited

U.S. PATENT DOCUMENTS

| | | |
|---|---|---|
| 5,544,049 A | 8/1996 | Henderson et al. |
| 5,600,778 A | 2/1997 | Swanson et al. |
| 5,613,163 A | 3/1997 | Marron et al. |
| 5,721,849 A | 2/1998 | Amro |
| 5,790,127 A | 8/1998 | Anderson et al. |
| 5,821,928 A | 10/1998 | Melkus et al. |
| 5,826,015 A | 10/1998 | Schmidt |
| 5,845,300 A | 12/1998 | Comer et al. |
| 5,859,640 A | 1/1999 | de Judicibus |
| 5,877,763 A | 3/1999 | Berry et al. |
| 5,883,626 A | 3/1999 | Glaser et al. |
| 5,884,282 A | 3/1999 | Robinson |
| 5,905,991 A | 5/1999 | Reynolds |
| 5,966,121 A | 10/1999 | Hubbell et al. |
| 6,005,575 A | 12/1999 | Colleran et al. |
| 6,018,341 A | 1/2000 | Berry et al. |
| 6,272,490 B1 | 8/2001 | Yamakita |
| 6,295,542 B1 | 9/2001 | Corbin |
| 6,301,573 B1 | 10/2001 | McIlwaine et al. |
| 6,377,965 B1 | 4/2002 | Hachamovitch et al. |
| 6,421,678 B2 | 7/2002 | Smiga et al. |
| 6,463,078 B1 | 10/2002 | Engstrom et al. |
| 6,546,393 B1 | 4/2003 | Khan |
| 6,564,213 B1 | 5/2003 | Ortega et al. |
| 6,647,383 B1 | 11/2003 | August et al. |
| 6,654,038 B1 | 11/2003 | Gajewska et al. |
| 6,751,604 B2 | 6/2004 | Barney et al. |
| 6,789,251 B1 | 9/2004 | Johnson |
| 6,820,075 B2 | 11/2004 | Shanahan et al. |
| 6,865,714 B1 | 3/2005 | Liu et al. |
| 6,889,337 B1 | 5/2005 | Yee |
| 6,907,447 B1 | 6/2005 | Cooperman et al. |
| 6,980,977 B2 | 12/2005 | Hoshi et al. |
| 7,003,506 B1 | 2/2006 | Fisk et al. |
| 7,003,737 B2 | 2/2006 | Chiu et al. |
| 7,031,963 B1 | 4/2006 | Bae |
| 7,035,903 B1 | 4/2006 | Baldonado |
| 7,039,658 B2 | 5/2006 | Starkey |
| 7,047,318 B1 | 5/2006 | Svedloff |
| 7,051,277 B2 | 5/2006 | Kephart et al. |
| 7,073,129 B1 | 7/2006 | Robarts et al. |
| 7,103,835 B1 | 9/2006 | Yankovich et al. |
| 7,111,231 B1 | 9/2006 | Huck et al. |
| 7,127,674 B1 | 10/2006 | Carroll et al. |
| 7,131,063 B2 | 10/2006 | Mateos |
| 7,146,422 B1 | 12/2006 | Marlatt et al. |
| 7,295,995 B1 | 11/2007 | York et al. |
| 7,353,252 B1 | 4/2008 | Yang et al. |
| 7,353,397 B1 | 4/2008 | Herbach |
| 7,356,768 B1 | 4/2008 | Levy et al. |
| 7,370,274 B1 | 5/2008 | Stuple et al. |
| 7,380,218 B2 | 5/2008 | Rundell |
| 7,386,789 B2 | 6/2008 | Chao et al. |
| 7,392,249 B1 | 6/2008 | Harris et al. |
| 7,395,507 B2 | 7/2008 | Robarts et al. |
| 7,406,659 B2 | 7/2008 | Klein et al. |
| 7,424,670 B2 | 9/2008 | Burke et al. |
| 7,451,389 B2 | 11/2008 | Huynh et al. |
| 7,480,715 B1 | 1/2009 | Barker et al. |
| 7,487,145 B1 | 2/2009 | Gibbs et al. |
| 7,499,919 B2 | 3/2009 | Meyerzon et al. |
| 7,499,940 B1 | 3/2009 | Gibbs |
| 7,647,312 B2 | 1/2010 | Dai |
| 7,664,786 B2 | 2/2010 | Oh et al. |
| 7,685,144 B1 | 3/2010 | Katragadda |
| 7,685,516 B2 | 3/2010 | Fischer |
| 7,716,236 B2 | 5/2010 | Sidhu et al. |
| 7,734,627 B1 | 6/2010 | Tong |
| 7,756,935 B2 | 7/2010 | Gaucas |
| 7,761,788 B1 | 7/2010 | McKnight et al. |
| 7,769,579 B2 | 8/2010 | Zhao et al. |
| 7,774,328 B2 | 8/2010 | Hogue et al. |
| 7,779,355 B2 | 8/2010 | Erol et al. |
| 7,783,965 B1 | 8/2010 | Dowd et al. |
| 7,818,678 B2 | 10/2010 | Massand |
| 7,836,044 B2 | 11/2010 | Kamvar et al. |
| 7,917,848 B2 | 3/2011 | Harmon et al. |
| 8,020,003 B2 | 9/2011 | Fischer |
| 8,020,112 B2 | 9/2011 | Ozzie et al. |
| 8,027,974 B2 | 9/2011 | Gibbs |
| 8,051,088 B1 | 11/2011 | Tibbetts et al. |
| 8,086,960 B1 | 12/2011 | Gopalakrishna et al. |
| 8,091,020 B2 | 1/2012 | Kuppusamy et al. |
| 8,117,535 B2 | 2/2012 | Beyer et al. |
| 8,185,448 B1 | 5/2012 | Myslinski |
| 8,224,802 B2 | 7/2012 | Hogue |
| 8,229,795 B1 | 7/2012 | Myslinski |
| 8,239,751 B1 | 8/2012 | Rochelle et al. |
| 8,260,785 B2 | 9/2012 | Hogue et al. |
| 8,261,192 B2 | 9/2012 | Djabarov |
| 8,346,620 B2 | 1/2013 | King et al. |
| 8,346,877 B2 | 1/2013 | Turner |
| 8,359,550 B2 | 1/2013 | Meyer et al. |
| 8,370,275 B2 | 2/2013 | Bhattacharya et al. |
| 8,386,914 B2 | 2/2013 | Baluja et al. |
| 8,434,134 B2 | 4/2013 | Khosrowshahi et al. |
| 8,453,066 B2 | 5/2013 | Ozzie et al. |
| 8,458,046 B2 | 6/2013 | Myslinski |
| 8,572,388 B2 | 10/2013 | Boemker et al. |
| 8,595,174 B2 | 11/2013 | Gao et al. |
| 8,621,222 B1 | 12/2013 | Das |
| 8,666,961 B1 | 3/2014 | Qureshi et al. |
| 8,667,394 B1 | 3/2014 | Spencer |
| 8,782,516 B1 | 7/2014 | Dozier |
| 8,799,765 B1 | 8/2014 | MacInnis et al. |
| 8,856,640 B1 | 10/2014 | Barr et al. |
| 8,856,645 B2 | 10/2014 | Vandervort et al. |
| 8,904,284 B2 | 12/2014 | Grant et al. |
| 9,092,414 B2 | 7/2015 | Levy et al. |
| 9,292,479 B2 | 3/2016 | Khosrowshahi et al. |
| 2001/0025287 A1 | 9/2001 | Okabe et al. |
| 2002/0010725 A1 | 1/2002 | Mo |
| 2002/0029337 A1 | 3/2002 | Sudia et al. |
| 2002/0035714 A1 | 3/2002 | Kikuchi et al. |
| 2002/0059327 A1 | 5/2002 | Starkey |
| 2002/0069223 A1 | 6/2002 | Goodisman et al. |
| 2002/0070977 A1 | 6/2002 | Morcos et al. |
| 2002/0103914 A1 | 8/2002 | Dutta et al. |
| 2002/0129100 A1 | 9/2002 | Dutta et al. |
| 2002/0152255 A1 | 10/2002 | Smith, Jr. et al. |
| 2002/0161839 A1 | 10/2002 | Colasurdo et al. |
| 2002/0187815 A1 | 12/2002 | Deeds et al. |
| 2003/0014443 A1 | 1/2003 | Bernstein et al. |
| 2003/0046263 A1 | 3/2003 | Castellanos et al. |
| 2003/0050995 A1 | 3/2003 | Mateos |
| 2003/0058286 A1 | 3/2003 | Dando |
| 2003/0069877 A1 | 4/2003 | Grefenstette et al. |
| 2003/0156130 A1 | 8/2003 | James et al. |
| 2003/0172353 A1 | 9/2003 | Cragun |
| 2003/0200192 A1 | 10/2003 | Bell et al. |
| 2003/0234822 A1 | 12/2003 | Spisak |

(56) References Cited

U.S. PATENT DOCUMENTS

| | | |
|---|---|---|
| 2004/0061716 A1 | 4/2004 | Cheung et al. |
| 2004/0062213 A1 | 4/2004 | Koss |
| 2004/0122846 A1 | 6/2004 | Chess et al. |
| 2004/0139465 A1 | 7/2004 | Matthews, III et al. |
| 2004/0140901 A1 | 7/2004 | Marsh |
| 2004/0145607 A1 | 7/2004 | Alderson |
| 2004/0153973 A1 | 8/2004 | Horwitz |
| 2004/0164991 A1 | 8/2004 | Rose |
| 2004/0177319 A1 | 9/2004 | Horn |
| 2005/0024487 A1 | 2/2005 | Chen |
| 2005/0028081 A1 | 2/2005 | Arcuri et al. |
| 2005/0034060 A1 | 2/2005 | Kotler et al. |
| 2005/0039191 A1 | 2/2005 | Hewson et al. |
| 2005/0044132 A1 | 2/2005 | Campbell et al. |
| 2005/0044369 A1 | 2/2005 | Anantharaman |
| 2005/0055416 A1 | 3/2005 | Heikes et al. |
| 2005/0120308 A1 | 6/2005 | Gibson et al. |
| 2005/0144162 A1 | 6/2005 | Liang |
| 2005/0144573 A1 | 6/2005 | Moody et al. |
| 2005/0160065 A1 | 7/2005 | Seeman |
| 2005/0183001 A1 | 8/2005 | Carter et al. |
| 2005/0183006 A1 | 8/2005 | Rivers-Moore et al. |
| 2005/0183143 A1 | 8/2005 | Anderholm et al. |
| 2005/0198589 A1 | 9/2005 | Heikes et al. |
| 2005/0210256 A1 | 9/2005 | Meier et al. |
| 2005/0234990 A1 | 10/2005 | Brighouse |
| 2005/0246653 A1 | 11/2005 | Gibson et al. |
| 2006/0005142 A1 | 1/2006 | Karstens |
| 2006/0010865 A1 | 1/2006 | Walker |
| 2006/0020662 A1 | 1/2006 | Robinson |
| 2006/0035632 A1 | 2/2006 | Sorvari et al. |
| 2006/0041836 A1 | 2/2006 | Gordon et al. |
| 2006/0047682 A1 | 3/2006 | Black et al. |
| 2006/0080303 A1 | 4/2006 | Sargent et al. |
| 2006/0106778 A1 | 5/2006 | Baldwin |
| 2006/0136552 A1 | 6/2006 | Krane et al. |
| 2006/0150087 A1 | 7/2006 | Cronenberger et al. |
| 2006/0190435 A1 | 8/2006 | Heidloff et al. |
| 2006/0213993 A1 | 9/2006 | Tomita |
| 2006/0248070 A1 | 11/2006 | Dejean et al. |
| 2007/0005581 A1 | 1/2007 | Arrouye et al. |
| 2007/0005697 A1 | 1/2007 | Yuan et al. |
| 2007/0033200 A1 | 2/2007 | Gillespie |
| 2007/0143317 A1 | 6/2007 | Hogue et al. |
| 2007/0150800 A1 | 6/2007 | Betz et al. |
| 2007/0156761 A1 | 7/2007 | Smith |
| 2007/0162907 A1 | 7/2007 | Herlocker et al. |
| 2007/0168355 A1 | 7/2007 | Dozier et al. |
| 2007/0192474 A1 | 8/2007 | Decasper et al. |
| 2007/0198952 A1 | 8/2007 | Pittenger |
| 2007/0220259 A1 | 9/2007 | Pavlicic |
| 2007/0280205 A1 | 12/2007 | Howell et al. |
| 2007/0291297 A1 | 12/2007 | Harmon et al. |
| 2007/0294610 A1 | 12/2007 | Ching |
| 2008/0022107 A1 | 1/2008 | Pickles et al. |
| 2008/0028284 A1 | 1/2008 | Chen |
| 2008/0034213 A1 | 2/2008 | Boemker et al. |
| 2008/0059539 A1 | 3/2008 | Chin et al. |
| 2008/0077571 A1 | 3/2008 | Harris et al. |
| 2008/0082907 A1 | 4/2008 | Sorotokin et al. |
| 2008/0120319 A1 | 5/2008 | Drews et al. |
| 2008/0172608 A1 | 7/2008 | Patrawala et al. |
| 2008/0208969 A1 | 8/2008 | Van Riel |
| 2008/0239413 A1 | 10/2008 | Vuong et al. |
| 2008/0320397 A1 | 12/2008 | Do et al. |
| 2009/0006936 A1 | 1/2009 | Parker et al. |
| 2009/0013002 A1* | 1/2009 | Eggink .................. G06F 16/68 |
| 2009/0013244 A1 | 1/2009 | Cudich et al. |
| 2009/0028392 A1 | 1/2009 | Ramachandrula et al. |
| 2009/0044143 A1 | 2/2009 | Karstens |
| 2009/0044146 A1 | 2/2009 | Patel et al. |
| 2009/0055377 A1* | 2/2009 | Hedge .................. G06F 16/435 |
| | | 707/999.005 |
| 2009/0083245 A1 | 3/2009 | Ayotte et al. |
| 2009/0094178 A1 | 4/2009 | Aoki |
| 2009/0132560 A1 | 5/2009 | Vignet |
| 2009/0192845 A1 | 7/2009 | Gudipaty et al. |
| 2009/0198670 A1 | 8/2009 | Shiffer et al. |
| 2009/0204818 A1 | 8/2009 | Shin et al. |
| 2009/0282144 A1 | 11/2009 | Sherrets et al. |
| 2009/0292673 A1 | 11/2009 | Carroll |
| 2010/0070448 A1 | 3/2010 | Omoigui |
| 2010/0070881 A1 | 3/2010 | Hanson et al. |
| 2010/0076946 A1 | 3/2010 | Barker et al. |
| 2010/0100743 A1 | 4/2010 | Ali et al. |
| 2010/0121888 A1 | 5/2010 | Cutting et al. |
| 2010/0131523 A1 | 5/2010 | Yu et al. |
| 2010/0180200 A1 | 7/2010 | Donneau-Golencer et al. |
| 2010/0191744 A1 | 7/2010 | Meyerzon et al. |
| 2010/0198821 A1 | 8/2010 | Loritz et al. |
| 2010/0223541 A1 | 9/2010 | Clee et al. |
| 2010/0251086 A1 | 9/2010 | Haumont et al. |
| 2010/0268700 A1 | 10/2010 | Wissner et al. |
| 2010/0269035 A1 | 10/2010 | Meyer et al. |
| 2010/0275109 A1 | 10/2010 | Morrill |
| 2010/0281353 A1 | 11/2010 | Rubin |
| 2010/0318530 A1 | 12/2010 | Massand |
| 2011/0016106 A1 | 1/2011 | Xia |
| 2011/0023022 A1 | 1/2011 | Harper et al. |
| 2011/0043652 A1 | 2/2011 | King et al. |
| 2011/0055177 A1 | 3/2011 | Chakra et al. |
| 2011/0060584 A1 | 3/2011 | Ferrucci et al. |
| 2011/0072052 A1 | 3/2011 | Skarin et al. |
| 2011/0072338 A1 | 3/2011 | Caldwell |
| 2011/0082876 A1 | 4/2011 | Lu et al. |
| 2011/0087973 A1 | 4/2011 | Martin et al. |
| 2011/0093476 A1 | 4/2011 | Fukazawa et al. |
| 2011/0126093 A1 | 5/2011 | Ozzie et al. |
| 2011/0150200 A1 | 6/2011 | Uhler et al. |
| 2011/0173210 A1 | 7/2011 | Ahn et al. |
| 2011/0179378 A1 | 7/2011 | Wheeler et al. |
| 2011/0191276 A1 | 8/2011 | Cafarella et al. |
| 2011/0209064 A1 | 8/2011 | Jorgensen et al. |
| 2011/0209075 A1 | 8/2011 | Wan |
| 2011/0219291 A1 | 9/2011 | Lisa |
| 2011/0225482 A1 | 9/2011 | Chan et al. |
| 2011/0225490 A1 | 9/2011 | Meunier |
| 2011/0252312 A1 | 10/2011 | Lemonik et al. |
| 2011/0276538 A1 | 11/2011 | Knapp et al. |
| 2011/0296291 A1 | 12/2011 | Melkinov et al. |
| 2011/0301935 A1 | 12/2011 | Quirk et al. |
| 2011/0306028 A1 | 12/2011 | Galimore |
| 2012/0019777 A1 | 1/2012 | Hauger et al. |
| 2012/0078826 A1 | 3/2012 | Ferrucci et al. |
| 2012/0084644 A1 | 4/2012 | Robert et al. |
| 2012/0089587 A1 | 4/2012 | Baird et al. |
| 2012/0095979 A1 | 4/2012 | Aftab et al. |
| 2012/0110087 A1 | 5/2012 | Culver et al. |
| 2012/0116812 A1 | 5/2012 | Boone et al. |
| 2012/0124053 A1 | 5/2012 | Ritchford et al. |
| 2012/0158527 A1 | 6/2012 | Cannelongo et al. |
| 2012/0166924 A1 | 6/2012 | Larson et al. |
| 2012/0185473 A1 | 7/2012 | Ponting et al. |
| 2012/0203734 A1 | 8/2012 | Spivack et al. |
| 2012/0226646 A1 | 9/2012 | Donoho et al. |
| 2012/0254165 A1 | 10/2012 | Brdiczka et al. |
| 2012/0254730 A1 | 10/2012 | Sunderland et al. |
| 2012/0284602 A1 | 11/2012 | Seed et al. |
| 2012/0304046 A1 | 11/2012 | Neill et al. |
| 2012/0317046 A1 | 12/2012 | Myslinski |
| 2013/0036344 A1 | 2/2013 | Ahmed et al. |
| 2013/0041685 A1 | 2/2013 | Yegnanarayanan |
| 2013/0103634 A1* | 4/2013 | Jojic .................... G06Q 30/02 |
| | | 706/52 |
| 2013/0132566 A1 | 5/2013 | Olsen et al. |
| 2013/0165086 A1 | 6/2013 | Doulton |
| 2013/0212062 A1 | 8/2013 | Levy et al. |
| 2013/0246346 A1 | 9/2013 | Khosrowshahi et al. |
| 2013/0268830 A1 | 10/2013 | Khosrowshahi et al. |
| 2014/0006399 A1 | 1/2014 | Vasudevan et al. |
| 2014/0013197 A1 | 1/2014 | McAfee et al. |
| 2014/0032913 A1 | 1/2014 | Tenenboym et al. |

(56) References Cited

U.S. PATENT DOCUMENTS

2014/0040249 A1 2/2014 Ploesser et al.
2014/0236958 A1 8/2014 Vaughn
2015/0012805 A1 1/2015 Bleiweiss et al.

OTHER PUBLICATIONS

"Series H: Audiovisual and Mul ti media Systems; Infrastructure of audiovisual services—Coding of moving video; Advanced video coding for generic audiovisual services". H.264. Version 3. International Telecommunication Union. Dated Mar. 2005, 343 pgs.
"Overview; VP7 Data Format and Decoder". Version 1.5. On2 Technologies, Inc. Dated Mar. 28, 2005, 65 pgs.
"Series H: Audiovisual and Mul ti media Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006, 16 pgs.
"VP6 Bitstream & Decoder Specification". Version 1.02. On2 Technologies, Inc. Dated Aug. 17, 2006, 88 pgs.
"Series H: Audiovisual and Mul ti media Systems; Infrastructure of audiovisual services—Coding of moving video". H.264. Amendment 2: New profiles for professional applications. International Telecommunication Union. Dated Apr. 2007, 75 pgs.
"VP6 Bitstream & Decoder Specification". Version 1.03. On2 Technologies, Inc. Dated Oct. 29, 2007, 95 pgs.
"Series H: Audiovisual and Mul ti media Systems; Infrastructure of audiovisual services—Coding of moving video". H.264. Advanced video coding for generic audiovisual services. Version 8. International Telecommunication Union. Dated Nov. 1, 2007, 564 pgs.
"Series H: Audiovisual and Mul ti media Systems; Infrastructure of audiovisual services—Coding of moving video". H.264. Advanced video coding for generic audiovisual services. International Telecommunication Union. Version 11. Dated Mar. 2009, 670 pgs.
"Series H: Audiovisual and Mul ti media Systems; Infrastructure of audiovisual services—Coding of moving video". H.264. Advanced video coding for generic audiovisual services. International Telecommunication Union. Version 12. Dated Mar. 2010, 676 pgs.
"Implementors' Guide; Series H: Audiovisual and Mul ti media Systems; Coding of moving video: Implementors Guide for H.264: Advanced video coding for generic audiovisual services". H.264. International Telecommunication Union. Version 12. Dated Jul. 30, 2010, 15 pgs.
"VP8 Data Format and Decoding Guide". WebM Project. Google On2. Dated: Dec. 1, 2010, 103 pgs.
Bankoski et al. "VP8 Data Format and Decoding Guide; draft-bankoski-vp8-bitstream-02" Network Working Group. Dated May 18, 2011, 288 pgs.
Bankoski et al. "Technical Overview of VP8, an Open Source Video Codec for the Web". Dated Jul. 11, 2011, 6 pgs.
Bankoski, J., Koleszar, J., Quillio, L., Salonen, J., Wilkins, P., and Y. Xu, "VP8 Data Format and Decoding Guide", RFC 6386, Nov. 2011, 5 pgs.
Mozilla, "Introduction to Video Coding Part 1: Transform Coding", Video Compression Overview, Mar. 2012, 171 pp.
Ashman. "Electronic Document Addressing: Dealing with Change." ACM Computing Surveys, vol. 32, No. 3, Sep. 2000, pp. 201-212.
Bohman, P. "Introduction to Web Accessibility", Oct. 2003, ebAIM, printed Apr. 17, 2004,; <http://www.webaim.org/intro/?templatetype=3> (p. 1-6).
Caldwell et al., "Web Content Accessibility Guidelines 2.0, W3C Working Draft Mar. 11, 2004", Mar. 11, 2004, World; Wide Web Consortium {p. 1-56).
David Sawyer McFarland, "CSS the missing manual", O'Reilly, Aug. 2009, pp. 7-101, 134-138, 428-429.

Electronic Signatures and Infrastructures ESI; PDF Advanced Electronic Signature Profiles; Part 4: PAdES Long Ter PAdES-LTV Profile, ETSI TS 102 778-4, V1.1.1, Jul. 2009, 19 pages.
Fox. "Maps API Blog: Creating Dynamic Client-side Maps Mashups with Google Spreadsheets." Mar. 2007, [retrieved on Dec. 5, 2011]. Retrieved from the Internet: <URL:http://googlemapsapi.blogspot.com/2007/03/creating-dynamic-client-side-maps.html>. 2 pages.
Francik, E., Computer-& screen-based interfaces: Universal design filter, Human Factors Engineering, Pacific Bell Version 2, Jun. 6, 1996.
GeekRant.org' [online]. "How to Embed a Word Document in Another Word Document," Sep. 14, 2005, [retrieved on Dec. 5, 2011]. Retrieved from the Internet: <URL:http://www.geekrant.org/2005/09/14/word-embed-document/>. 6 pages.
Griesser, A., "A generic editor Full text," pp. 50-55, 1997 ACM Press NewYork, NY, USA.
Herb Tyson, Microsoft Word 2010 Bible, John Wiley & Sons, pp. 221,757,833, Jun. 21, 2010.
Herrick. "Google this Using Google Apps for Collaboration and Productivity." Proceedings of the ACM Siguccs Fall Conference on User Services Conference, Siguccs '09, Jan. 2009, p. 55.
https://en.wikipedia.org/wiki/Backus%E2%80%93Naur_Form, as of Jul. 14, 2013.
https://en.wikipedia.org/wiki/Regular_expression, as of Sep. 2, 2013.
International Search Report and Written Opinion of the International Searching Authority in PCT Application No. PCT/US2011/037862, dated Oct. 31, 2011, 64 pages.
Jacobs, Ian, et al., "User Agent Accessibility Guidelines 1.0, W3C Recommendation Dec. 17, 2002", World Wide Web Consortium, 115 pages.
Jourdan, Guy-Vincent, CSI 3140 WWW Structures, Techniques and Standards, Cascading Style Sheets, power point slides, published Feb. 16, 2010.
Kappe. "Hyper-G: A Distributed Hypermedia System." Proceedings of the International Networking Conference, 1993, retrieved on Oct. 20, 2011]. Retrieved from the Internet: <URL:http://ftp.iicm.tugraz.at/pub/papers/inet93.pdf>. 9 pages.
Kircher. "Lazy Acquisition." Proceedings of the 6th European Conference on Pattern Languages of Programs, Jul. 2011, pp. 1-11.
Microsoft Support' [online]. "How to Embed and Automate Office Documents with Visual Basic," Mar. 27, 2007, [retrieved on Dec. 5, 2011]. Retrieved from the Internet: <URLhttp://support.microsoft.com/kb/242243> 6 pages.
Microsoft Support' [online]. "OLE Concepts and Requirements Overview," Oct. 27, 1999, [retrieved on Dec. 2, 2011]. Retrieved from the Internet: <URL:http://support.microsoft.com/kb/86008>. 3 pages.
Oracle Provider for OLE DB—Developer's Guide. 10g Release 1 (10.1) Dec. 2003, Oracle Corp., 90 pages.
Pinkas et al. "CMS Advanced Electronic Signatures," Request for Comments 5126, Feb. 2008, 142 pages.
Treviranus, Jutta, et al., "Authoring Tool Accessibility Guidelines 1.0, W3C Recommendation Feb. 3, 2000", World Wide Web Consortium (p. 1-22).
W3C, Cascading Style sheets Level 2 Revision 1 Specification, Apr. 15, 2011, 487 pages.
WebArchive [online]. "Supplementary Notes for MFC Programming Module 23 and Module 27: Interfaces, Com.Com+ and OLE" in: http://www.tenouk.com/visualcplusmfc/mfcsupp/ole.html, Jan. 6, 2008, [retrieved on Dec. 5, 2011]. Retrieved from the Internet: <URL:http://web.archive.org/web/20091125073542/http://www.tenouk.com/visualcplusmfcrnfcsupp/ole.html>. 4 pages.
Timestamp from Wikipedia, accessed from https://en.wikipedialcorg/wiki/Timestamp, archived by WaybackMachine on Sep. 15, 2012, pp. 1-2.
Bankoski J., et al., "VP8 Data Format and Decoding Guide," Independent Submission, RFC: 6386, Nov. 2011, 305 Pages.

* cited by examiner

AUTOMATED COLLABORATION

RELATED APPLICATIONS

This application is a continuation application of co-pending U.S. patent application Ser. No. 17/723,447, filed Apr. 18, 2022, which is a continuation application of U.S. patent application Ser. No. 16/149,458, filed Oct. 2, 2018, now U.S. Pat. No. 11,308,037, which is a continuation application of U.S. patent application Ser. No. 13/663,750, filed Oct. 30, 2012, now abandoned, each of which is incorporated herein by reference.

TECHNICAL FIELD

This application relates to document collaboration.

BACKGROUND

Productivity applications, such as word processing applications and spreadsheet applications, may execute on a local computing device. Locally generated documents may be difficult to share with other computing devices, and collaboration on shared documents may be slow and prone to error.

Networked productivity applications, which may include processing or storing documents at a central location, may reduce the difficulties encountered with sharing locally generated and stored documents, and may allow for improved ease of collaboration. Accordingly, it would be advantageous to provide a method and apparatus for automated collaboration.

SUMMARY

Disclosed herein are aspects of systems, methods, and apparatuses for automated collaboration.

An aspect is a method for method for automated collaboration within a networked productivity application. The method comprises determining, by a processing device, that a user action is performed with respect to a first document accessed by a first user of the networked productivity application, and responsive to determining that the user action is performed with respect to the first document, identifying, by the processing device, a collaborative similarity between the first document and a second document accessed by a second user of the networked productivity application, the collaborative similarity being identified based on a similarity of content of the first document and the second document, and additional information associated with the first document and the second document. The method also comprises responsive to identifying the collaborative similarity between the first document and the second document, generating, by the processing device, a collaboration suggestion for collaboration between the first user and the second user on the content of the first document and the second document, and transmitting, by the processing device, the collaboration suggestion to collaborate on the content of the first document and the second document to at least one of the first user or the second user. The method further comprises receiving, by the processing device, an acceptance of the collaboration suggestion to collaborate on the content of the first document and the second document from the at least one of the first user or the second user, and responsive to receiving the acceptance of the collaboration suggestion from the at least one of the first user and the second user, creating, by the processing device and based on the first document and the second document, a third document available to each of the first user and the second user to collaborate on the content of the first document and the second document.

Another aspect is a system comprising a memory, and a processing device, coupled to the memory, to performing operations comprising determining that a user action is performed with respect to a first document accessed by a first user of a networked productivity application; and responsive to determining that the user action is performed with respect to the first document, identifying a collaborative similarity between the first document and a second document accessed by a second user of the networked productivity application, the collaborative similarity being identified based on a similarity of content of the first document and the second document, and additional information associated with the first document and the second document. The operations further comprise responsive to identifying the collaborative similarity between the first document and the second document, generating a collaboration suggestion for collaboration between the first user and the second user on the content of the first document and the second document, transmitting the collaboration suggestion to collaborate on the similar content of the first document and the second document to at least one of the first user or the second user, receiving an acceptance of the collaboration suggestion to collaborate on similar content of the first document and the second document from the at least one of the first user or the second user, and responsive to receiving the acceptance of the collaboration suggestion from the at least one of the first user and the second user, creating, based on the first document and the second document, a third document available to each of the first user and the second user to collaborate on the content of the first document and the second Variations in these and other aspects will be described in additional detail hereafter.

Another aspect is a method for automated collaboration within a networked productivity application. The method comprises determining, by a processing device, that a user action is performed with respect to a first document accessed by a first user of the networked productivity application, concurrent with determining that the user action is performed with respect to the first document, identifying, by the processing device, a collaborative similarity between the first document and a second document accessed by a second user of the networked productivity application, the collaborative similarity being identified based on a similarity of content of the first document and the second document, and additional information associated with the first document and the second document; and creating, by the processing device and based on the collaborative similarity, a third document available to each of the first user and the second user to collaborate on the content of the first document and the second document.

BRIEF DESCRIPTION OF THE DRAWINGS

The description herein makes reference to the accompanying drawings wherein like reference numerals refer to like parts throughout the several views, and wherein.

DETAILED DESCRIPTION

Productivity applications, such as word processing applications and spreadsheet applications may allow for the creation and modification of documents. Networked applications, which may process or store application data at a shared location, may allow for quick and easy application sharing and collaboration. Networked productivity applications may allow the sharing of documents and for quick and easy collaboration in the creation and modification of documents, such as word processing documents and spreadsheets. Networked productivity applications may use information proactively indicated by users to establish collaboration sessions. In some cases, a user may not recognize that a collaboration opportunity exists or may not have information necessary to initiate a collaboration session.

Automated collaboration may automatically identify collaboration opportunities between users of a networked application. For example, automated collaboration may include identifying similarities between two or more documents created or modified in the networked application. The collaboration similarity may be based on content of the documents, based on information associated with the documents, such as user information or contextual information, or based on a combination of content and associated information.

Automated collaboration may include notifying the users of the networked application of a collaboration suggestion, and, in response to an acceptance of the collaboration suggestion, establishing a collaboration session. In some implementations, automated collaboration may include indicating similarities between the documents to the users of the networked application in, for example, a collaboration document generated for the collaboration session and provided to the collaborators via the networked application.

Figure 1:
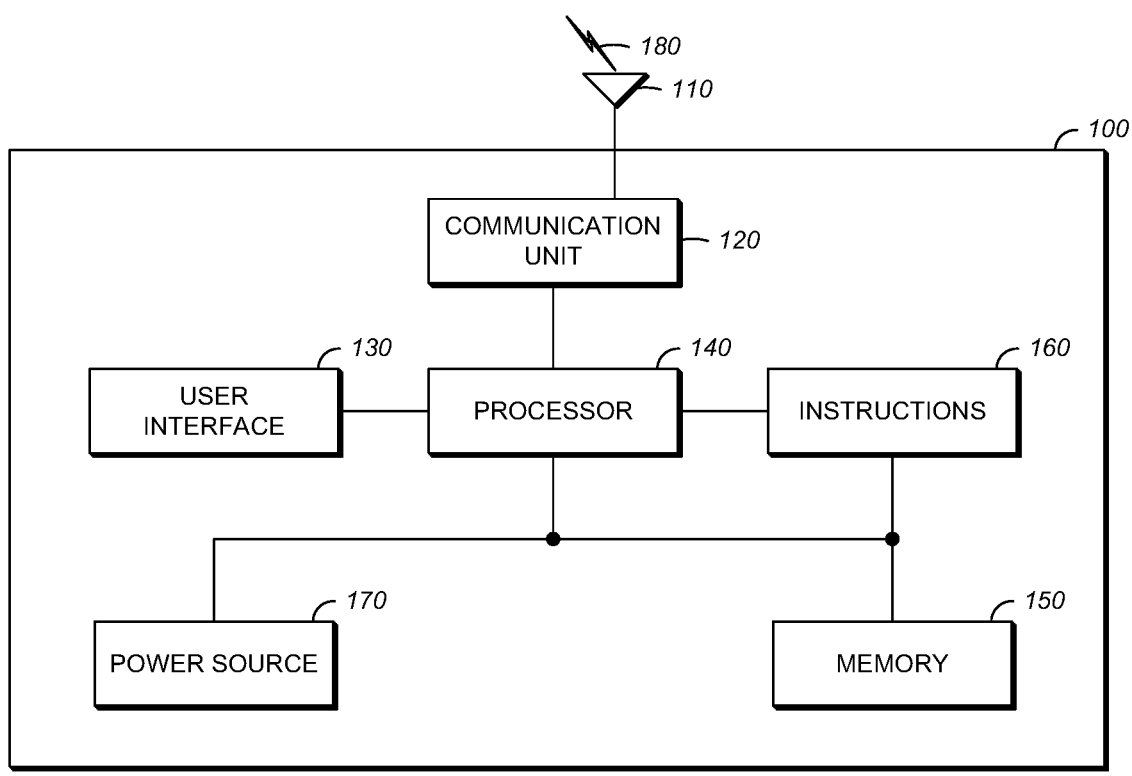
FIG. 1 is a diagram of a computing device in accordance with implementations of this disclosure.

FIG. 1 is a diagram of a computing device 100 in accordance with implementations of this disclosure. A computing device 100 can include a communication interface 110, a communication unit 120, a user interface (UI) 130, a processor 140, a memory 150, instructions 160, a power source 170, or any combination thereof. As used herein, the term "computing device" includes any unit, or combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one or more element of the communication device 100 can be integrated into any number of separate physical units. For example, the UI 130 and processor 140 can be integrated in a first physical unit and the memory 150 can be integrated in a second physical unit.

The communication interface 110 can be a wireless antenna, as shown, a wired communication port, such as an Ethernet port, an infrared port, a serial port, or any other wired or wireless unit capable of interfacing with a wired or wireless electronic communication medium 180.

The communication unit 120 can be configured to transmit or receive signals via a wired or wireless medium 180. For example, as shown, the communication unit 120 is operatively connected to an antenna configured to communicate via wireless signals. Although not explicitly shown in FIG. 1, the communication unit 120 can be configured to transmit, receive, or both via any wired or wireless communication medium, such as radio frequency (RF), ultra violet (UV), visible light, fiber optic, wire line, or a combination thereof. Although FIG. 1 shows a single communication unit 120 and a single communication interface 110, any number of communication units and any number of communication interfaces can be used.

The UI 130 can include any unit capable of interfacing with a user, such as a virtual or physical keypad, a touchpad, a display, a touch display, a speaker, a microphone, a video camera, a sensor, or any combination thereof. The UI 130 can be operatively coupled with the processor, as shown, or with any other element of the communication device 100, such as the power source 170. Although shown as a single unit, the UI 130 may include one or more physical units. For example, the UI 130 may include an audio interface for performing audio communication with a user, and a touch display for performing visual and touch based communication with the user. Although shown as separate units, the communication interface 110, the communication unit 120, and the UI 130, or portions thereof, may be configured as a combined unit. For example, the communication interface 110, the communication unit 120, and the UI 130 may be implemented as a communications port capable of interfacing with an external touchscreen device.

The processor 140 can include any device or system capable of manipulating or processing a signal or other information now-existing or hereafter developed, including optical processors, quantum processors, molecular processors, or a combination thereof. For example, the processor 140 can include a general purpose processor, a special purpose processor, a conventional processor, a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors. The processor can be operatively coupled with the communication interface 110, communication unit 120, the UI 130, the memory 150, the instructions 160, the power source 170, or any combination thereof.

The memory 150 can include any non-transitory computer-usable or computer-readable medium, such as any tangible device that can, for example, contain, store, communicate, or transport the instructions 160, or any information associated therewith, for use by or in connection with the processor 140. The non-transitory computer-usable or computer-readable medium can be, for example, a solid state drive, a memory card, removable media, a read only memory (ROM), a random access memory (RAM), any type of disk including a hard disk, a floppy disk, an optical disk, a magnetic or optical card, an application specific integrated circuits (ASICs), or any type of non-transitory media suitable for storing electronic information, or any combination thereof. The memory 150 can be connected to, for example, the processor 140 through, for example, a memory bus (not explicitly shown).

The instructions 160 can include directions for performing any method, or any portion or portions thereof, disclosed herein. The instructions 160 can be realized in hardware, software, or any combination thereof. For example, the instructions 160 may be implemented as information stored in the memory 150, such as a computer program, that may be executed by the processor 140 to perform any of the respective methods, algorithms, aspects, or combinations thereof, as described herein. The instructions 160, or a portion thereof, may be implemented as a special purpose processor, or circuitry, that can include specialized hardware for carrying out any of the methods, algorithms, aspects, or combinations thereof, as described herein. Portions of the instructions 160 can be distributed across multiple processors on the same machine or different machines or across a network such as a local area network, a wide area network, the Internet, or a combination thereof.

The power source 170 can be any suitable device for powering the communication device 110. For example, the power source 170 can include a wired power source; one or more dry cell batteries, such as nickel-cadmium (NiCd), nickel-zinc (NiZn), nickel metal hydride (NiMH), lithium-ion (Li-ion); solar cells; fuel cells; or any other device capable of powering the communication device 110. The communication interface 110, the communication unit 120, the UI 130, the processor 140, the instructions 160, the memory 150, or any combination thereof, can be operatively coupled with the power source 170.

Although shown as separate elements, the communication interface 110, the communication unit 120, the UI 130, the processor 140, the instructions 160, the power source 170, the memory 150, or any combination thereof can be integrated in one or more electronic units, circuits, or chips.

Figure 2:
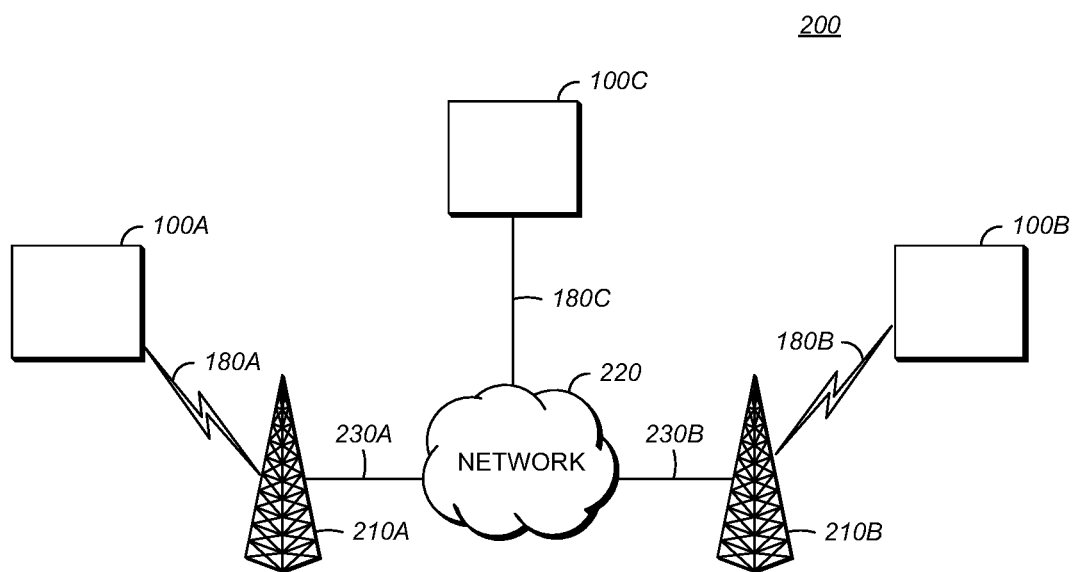
FIG. 2 is a diagram of a computing and communications system in accordance with implementations of this disclosure.

FIG. 2 is a diagram of a computing and communications system 200 in accordance with implementations of this disclosure. The computing and communications system 200 may include one or more computing and communication devices 100A/100B/100C, one or more access points 210A/210B, one or more networks 220, or a combination thereof. For example, the computing and communication system 200 can be a multiple access system that provides communication, such as voice, data, video, messaging, broadcast, or a combination thereof, to one or more wired or wireless communicating devices, such as the computing and communication devices 100A/100B/100C. Although, for simplicity, FIG. 2 shows three computing and communication devices 100A/100B/100C, two access points 210A/210B, and one network 220, any number of computing and communication devices, access points, and networks can be used.

A computing and communication device 100A/100B/100C can be, for example, a computing device, such as the computing device 100 shown in FIG. 1. For example, as shown the computing and communication devices 100A/100B may be user devices, such as a mobile computing device, a laptop, a thin client, or a smartphone, and computing and the communication device 100C may be a server, such as a mainframe or a cluster. Although the computing and communication devices 100A/100B are described as user devices, and the computing and communication device 100C is described as a server, any computing and communication device may perform some or all of the functions of a server, some or all of the functions of a user device, or some or all of the functions of a server and a user device.

Each computing and communication device 100A/100B/100C can be configured to perform wired or wireless communication. For example, a computing and communication device 100A/100B/100C can be configured to transmit or receive wired or wireless communication signals and can include a user equipment (UE), a mobile station, a fixed or mobile subscriber unit, a cellular telephone, a personal computer, a tablet computer, a server, consumer electronics, or any similar device. Although each computing and communication device 100A/100B/100C is shown as a single unit, a computing and communication device can include any number of interconnected elements.

Each access point 210A/210B can be any type of device configured to communicate with a computing and communication device 100A/100B/100C, a network 220, or both via wired or wireless communication links 180A/180B/180C. For example, an access point 210A/210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A/210B is shown as a single unit, an access point can include any number of interconnected elements.

The network 220 can be any type of network configured to provide services, such as voice, data, applications, voice over internet protocol (VoIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the transmission control protocol (TCP), the user datagram protocol (UDP), the internet protocol (IP), the real-time transport protocol (RTP) the Hyper Text Transport Protocol (HTTP), or a combination thereof.

The computing and communication devices 100A/100B/100C can communicate with each other via the network 220 using one or more a wired or wireless communication links, or via a combination of wired and wireless communication links. For example, as shown the computing and communication devices 100A/100B can communicate via wireless communication links 180A/180B, and computing and communication device 100C can communicate via a wired communication link 180C. Any of the computing and communication devices 100A/100B/100C may communicate using any wired or wireless communication link, or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A/210B can communicate with the network 220 via one or more types of wired or wireless communication links 230A/230B. Although FIG. 2 shows the computing and communication devices 100A/100B/100C in communication via the network 220, the computing and communication devices 100A/100B/100C can communicate with each other via any number of communication links, such as a direct wired or wireless communication link.

Other implementations of the computing and communications system 200 are possible. For example, in an implementation the network 220 can be an ad-hock network and can omit one or more of the access points 210A/210B. The computing and communications system 200 may include devices, units, or elements not shown in FIG. 2. For example, the computing and communications system 200 may include many more communicating devices, networks, and access points.

Figure 3:
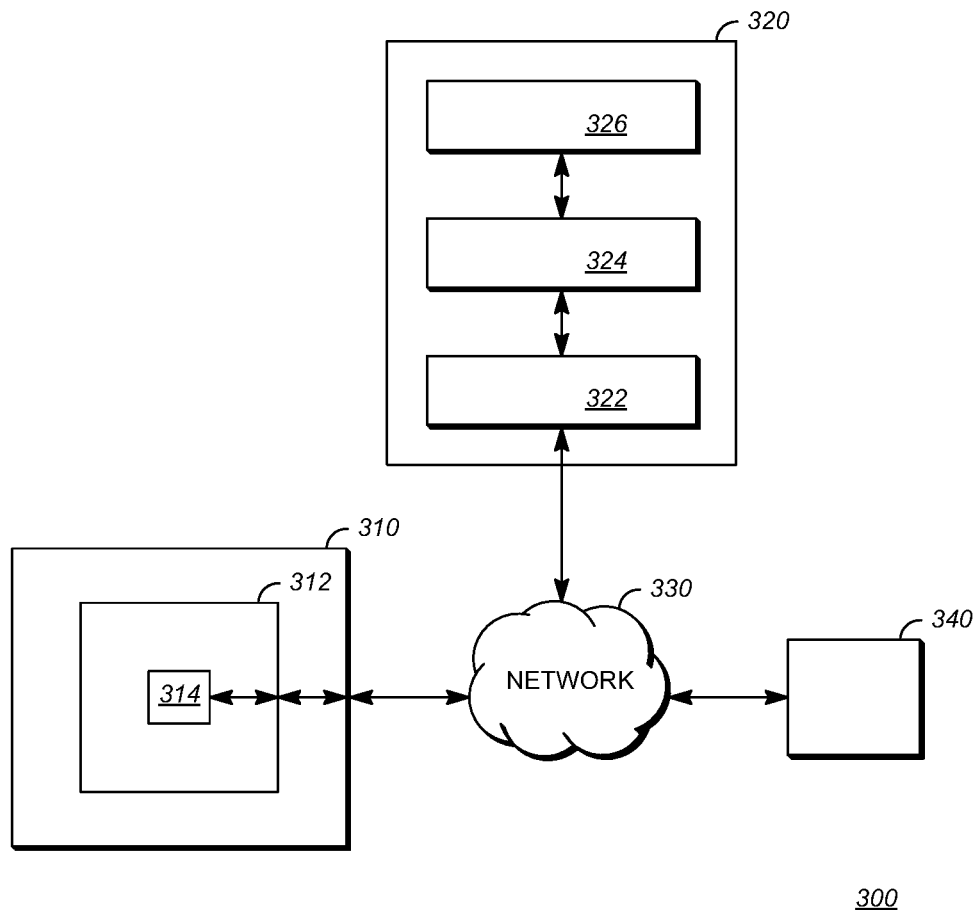
FIG. 3 is a diagram of a communication system for a networked application in accordance with implementations of this disclosure.

FIG. 3 is a diagram of a communication system for a networked application 300 in accordance with implementations of this disclosure. Executing the networked application 300 may include a user device 310, which may be a computing device, such as the computing device 100 shown in FIG. 1 or the computing and communication devices 100A/100B shown in FIG. 2, communicating with a server 320, which may be a computing device, such as the computing device 100 shown in FIG. 1 or computing and communication device 100C shown in FIG. 2, via a network 330, such as the network 220 shown in FIG. 2.

In some implementations, the server 320 may execute a portion or portions of the networked application 300, which may include, for example, generating, modifying, and storing documents and information related to the documents, such as metadata, and providing information for displaying and interacting with the networked application 300 to the user device 310. In some implementations, the server 320 may include one or more logical units 322/324/326. For example, the server 320 may include a web server 322 for receiving and processing requests, such as HTTP requests, from user devices; an application server 324 for executing applications, such as a spreadsheet application or a word processing application; and a database 326 for storing and managing data, such as documents or information about documents, such as metadata. In some implementations, the server 320 may provide information for the networked application 300 to the user device 310 using one or more protocols, such as HyperText Markup Language (HTML), Cascading Style Sheets (CSS), Extensible Markup Language (XML), or JavaScript Object Notation (JSON).

The user device 310 may execute a portion or portions of the networked application 300. For example, the user device 310 may execute a local application 312, such as a browser application, which may receive information from the server 320 and may present a representation of an interface 314 for displaying the networked application 300 and user interactions therewith. For example, the user device 310, may execute a browser application, the browser application may send a request, such as an HTTP request, for the networked application 300 to the server 320, the browser may receive information for presenting the networked application 300, such as HTML and XML data, and the browser may present an interface for the networked application 300. The user device 310 may execute portions of the networked application 300, which may include executable instructions, such as JavaScript, received from the server 320. The user device 310 may receive user input for the networked application 300, may update the interface 314 for the networked application 300 in response to the user input, and may send information for the networked application 300, such as information indicating the user input, to the server 320.

In some implementations, a portion or portions of the networked application may be cashed at the user device 310. For example, the user device 310 may execute a portion or portions of the networked application 300 using information previously received from the server 320 and stored on the user device 310. Although the user device 310 and the server 320 are shown separately, they may be combined. For example, a physical device, such as the computing device 100 shown in FIG. 1 may execute the user device 310 as a first logical device and may execute the server 320 as a second logical device.

In some implementations, the networked application 300 may generate files, folders, or documents, such as spreadsheets or word processing documents. The files, folders, or documents, may be created and stored on the user device 310, the server 320, or both. For example, a document may be created and stored on the server 320 and a copy of the document may be transmitted to the user device 310. Modifications to the document may be made on the user device 310 and transmitted to the server 320. In another example, a document may be created and stored on the user device 310 and the document, or modifications to the document, may be transmitted to the server 320.

In some implementations, a networked application, or an element thereof, may be accessed by multiple user devices. For example, the networked application 300 may be executed by a first user device 310 in communication with the server 32, and a document may be stored at the server 320. The networked application 300 may be executed by a second user device 340, which may be a computing device, such as the computing device 100 shown in FIG. 1 or the computing and communication devices 100A/100B shown in FIG. 2, a user may input modifications to the document at the second user device 340, and the modifications may be saved to the server 320.

In some implementation, a networked application, or an element thereof, may be collaboratively accessed by multiple user devices. For example, a first user device 310 may execute a first instance of the networked application 300 in communication with the server 320, and a document may be stored at the server 320. The first user device 310 may continue to display or edit the document. The second user device 340 may concurrently, or substantially concurrently, execute a second instance of the networked application 300, and may display or edit the document. User interactions with the document at one user device may be propagated to collaborating user devices. For example, one or both of the user devices 310/340 may transmit information indicating user interactions with the document to the server 320, and the server may transmit the information, or similar information, to the other user device 310/340. Although FIG. 3 shows two user devices, any number of user devices may collaborate. User interactions with the networked application 300 at one user device may be propagated to collaborating user devices in real-time, or near real-time. Some user interactions with the networked application 300 may not be transmitted to the server 320 and may not be propagated to the collaborating user devices.

Figure 4:
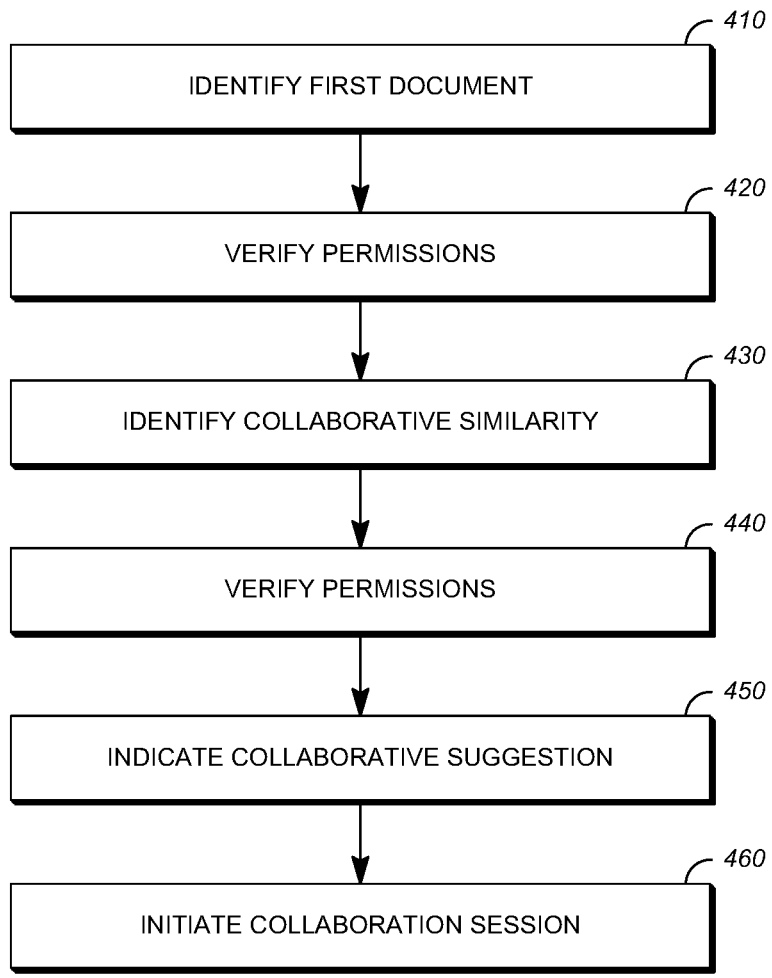
FIG. 4 is a block diagram of automated collaboration in accordance with implementations of this disclosure.

FIG. 4 is a block diagram of automated collaboration in accordance with implementations of this disclosure. Implementations of automated collaboration can include one or more user devices, such as the computing device 100 shown in FIG. 1 or the computing and communication devices 100A/100B shown in FIG. 2, synchronously (concurrently) or asynchronously creating, accessing, or editing one or more documents via a networked application, such as the networked application 300 shown in FIG. 3, executed by a server, which may be a computing device, such as the computing device 100 shown in FIG. 1 or the computing and communication devices 100C shown in FIG. 2.

Implementations of automated collaboration can include identifying a document at 410, verifying permissions at 420, identifying a collaborative similarity at 430, verifying permissions at 440, indicating a collaboration suggestion at 450, generating a collaboration document at 460, or a combination thereof.

A document may be identified at 410. The document may be identified based on a newly created document or based on an existing document, such as a document stored in a database or file system. In some implementations, the document may be identified based on a metric associated with user interaction with the document, such as a request to open, modify, or store the document. In some implementations, the document may be identified based on a metric associated with user interaction with another document, such as a request to open, modify, or store the other document. In some implementations, the document may be identified based on a metric not associated with user interaction. For example, the first document may be identified based on a review or analysis of stored documents. In some implementations, the document may be identified based on a combination of metrics, which may include metrics associated with user interaction with the document, metrics associated with user interaction with another document, or metrics not associated with user interaction.

In some implementations, identifying the document may include identifying information associated with the document, such as metadata. Information associated with a document may include temporal information, such as information indicating a date, a time, or a date and time when the document was created (creation information), opened or viewed (access information), or modified (modification information). Information associated with a document may include user information, such as biographical information. Information associated with a document may include location information, such as physical or virtual location information. Information associated with a document may include contextual information, such as event or situation information. Information associated with a document may include relationship information, such as information indicating an organizational relationship, a contextual relationship, or an interpersonal relationship. Information associated with a document may include any other information relevant to the document.

The networked application, or a portion of the networked application, such as the server portion, may verify permissions based on the identified document at 420. For example, verifying permissions may include determining whether the identified document or a user associated with the identified document is associated with an indication that collaboration is allowed or that collaboration is disallowed. In some implementations, verifying permissions may include determining whether information associated with the identified document may be used for automated collaboration. In some implementations, permissions may be verified for a user that is not associated with a document. For example, permissions may be verified for a user when the networked application is instantiated, which may be before a document is created, accessed, or modified.

In some implementations, verifying permissions may include determining that a user, a document, or both are associated with an indication that automated collaboration is not allowed and automated collaboration may not be performed.

The networked application, or a portion of the networked application, such as the server portion, may identify a collaborative similarity at 430. The collaborative similarity may be identified based on one or more collaboration metrics, such as the content of a document (content information) or information associated with a document (metadata information), or based on a combination of collaboration metrics. Identifying a collaborative similarity may include using a threshold, such as a threshold based on a degree of similarity. In some implementations, identifying collaborative similarity may include weighting the metrics. For example, a relatively high threshold may be used for identifying a collaborative similarity based on content, a weight may be applied to the threshold to lower the threshold where the collaborative similarity is based on content similarity and one or a few points of metadata similarity, and a greater weight may be applied to lower the threshold further where the collaborative similarity is based on content similarity and several points of metadata similarity. In some implementations, identifying a collaborative similarity may be performed substantially concurrently with creation, access, or modification of a document.

In some implementations, the collaborative similarity may be identified based on content, such as the text, of a document. For example, the networked application may compare the content of a document, such as the identified document, with content of one or more other documents, and a collaborative similarity may be identified based on the similarity of the content. The other documents may be, for example, documents shared with the creator, editor, or viewer of the identified document, such as privately shared documents, documents shared in a group, or publically shared documents.

Content similarity may be identified based on similarity between identified content similarity metrics, which may indicate words or phrases a document. For example, content similarity may be based on one or more consecutive sequences of words within each document, which may be referred to as a shingle. In another example, content similarity may be based on term vectors indicating word frequency within each document. In another example, content similarity may be based on clusters indicating ordered groups of terms, such as ordered pairs of words. The ordered pairs may be sequential or non-sequential. In some implementations, content similarity may be identified based on a combination of content similarity metrics.

In some implementations, the networked application may parse the content of a document, or a portion of the content of a document, to identify content similarity metrics, such as shingles, term vectors, or clusters, and may compare the identified content similarity metrics for the document with identified content similarity metrics for one or more other documents. The networked application may parse or sample the documents synchronously or asynchronously. In some implementations, the networked application may compare content similarity metrics for a document to stored content similarity metrics, such as content similarity metrics that were previously identified and stored for one or more other documents. In some implementations, identifying a content similarity may include weighting the content similarity metrics. For example, some content similarity metrics may appear infrequently in a document, may be relatively relevant to content similarity, and may be given greater weight than content similarity metrics that appear frequently in the document. In another example, some content similarity metrics may appear infrequently in the language or dialect of the document and may be more relatively relevant to content similarity.

In some implementations, identifying a content similarity may include using a threshold, such as a minimum degree of content similarity, a maximum degree of content similarity, or an average degree of content similarity. For example, a degree of content similarity between two documents may be greater than a minimum content similarity threshold, which may be lower than a threshold associated with identifying plagiarism, and a collaborative similarity may be identified.

Figure 5:
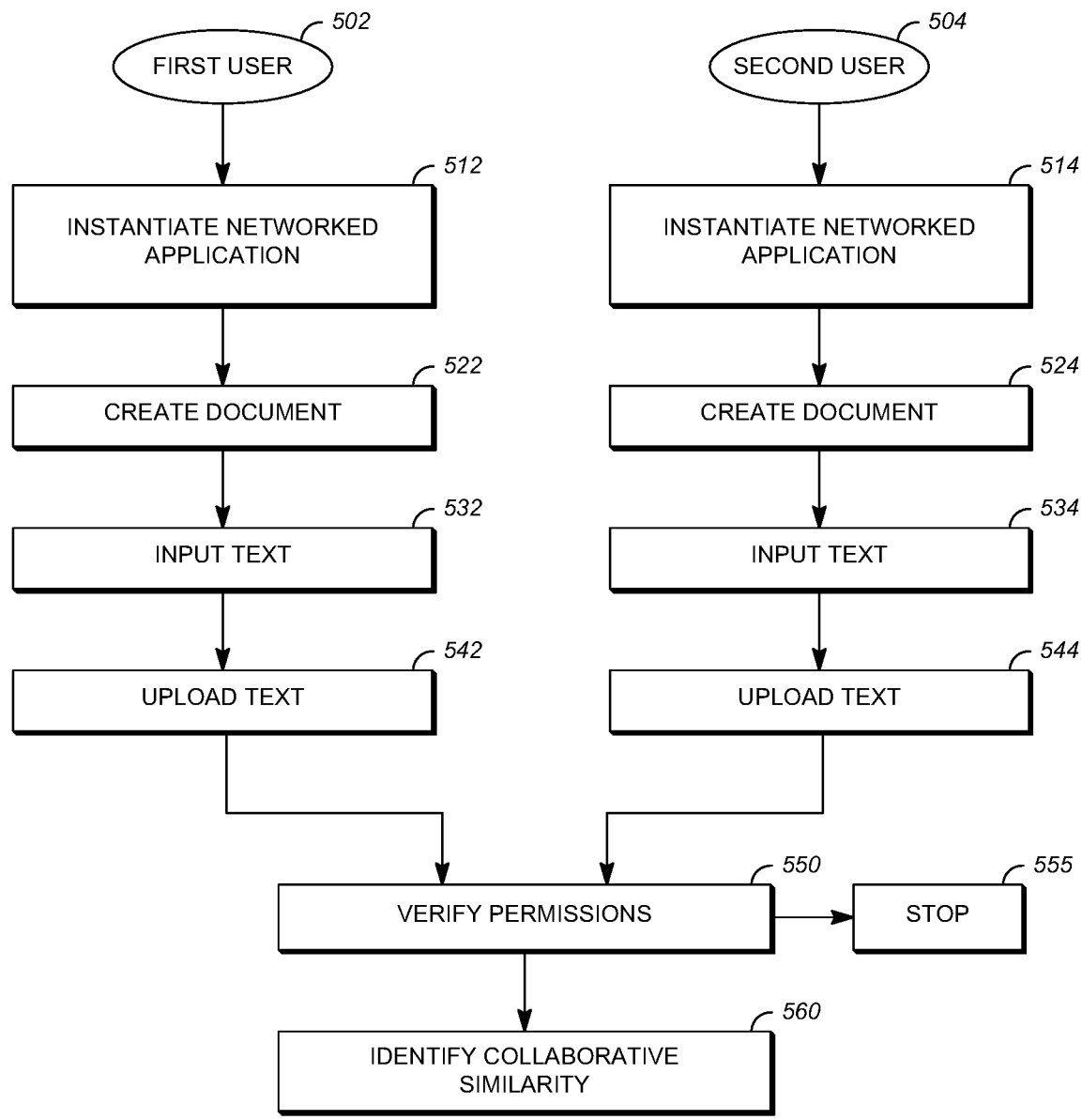
FIG. 5 is a block diagram of an example of identifying a content similarity on in accordance with implementations of this disclosure.

FIG. 5 is a block diagram of an example of identifying a content similarity on in accordance with implementations of this disclosure. In an implementation, a first student 502 may create a first document to take notes in a class. The first student 502 may instantiate the networked application at 512, may create a first new document at 522, and may input the text "Notes for CE101, intro to information theory" at 532. The document, including the input text may be transmitted to the server at 542. Similarly, a second student 504 may create a second document to take notes in the class. The second student 504 may instantiate the networked application at 514, may create a second new document at 524, and may input the text "CE101: notes on information theory" at 534. The document, including the input text may be transmitted to the server at 544.

The server may determine whether permissions allow automated collaboration for each student and each document at 550. For example, the permissions for one of the students may not allow automated collaboration and automated collaboration may not be performed, as indicated at 555.

The permissions may allow automated collaboration and the server may identify one or more content similarity metrics for the documents at 560. For example, the server may identify clusters indicating the term 'notes' appearing before the term 'CE101', the term 'intro' appearing before the term 'theory', and the term 'information' appearing before the term 'theory'. Similarly, the server may identify clusters indicating the term 'notes' appearing before the term 'information', the term 'CE101' appearing before the term 'notes', and the term 'information' appearing before the term 'theory'. The server may identify a collaborative similarity between the two documents based on a comparison of the content similarity metrics associated with the two documents.

In some implementations, a collaborative similarity may be identified based on information associated with a document, such as metadata. For example, information associated with a document may include temporal information, user information, location information, contextual information, relationship information, or any other information relevant to the document. The information associated with a document may be explicit or implicit. For example, the networked application may store, such as at the server, information explicitly indicating information associated with the document. In another example, the networked application may identify the information associated with the document implicitly based on other information, which may include information associated with the document, information associated with other documents, information associated with a user of the networked application, such as a creator of the document, or any other information from any information source, or combination of information sources.

In some implementations, the information associated with the document may indicate temporal information and the collaborative similarity may be identified based on the temporal information. For example, the information associated with the first document may include one or more temporal indicators, such as a creation indicator, indicating a date, a time, or a date and a time, the document was created; an access indicator, indicating a date, a time, or a date and time, a user accessed the document; or a modification indicator, indicating a date, a time, or a date and time, the document was modified. A collaborative similarity may be identified based on temporal proximity between a temporal indicator associated with a document and a temporal indicator associated with another document. In some implementations, the collaborative similarity may be identified based on a comparison of the difference between temporal indicators and a threshold value, such as a minimum temporal difference, a maximum temporal difference, or an average temporal difference.

For example, a student may create a document to take notes in a class and the document may be associated with a creation indicator indicating a date and time the document was created. Another student may create another document to take notes for the class and the second document may be associated with another creation indicator indicating a similar date and time. The server may identify a collaborative similarity based on a determination that the difference between the first creation indicator and the second creation indicator is less than a maximum temporal difference threshold.

In some implementations, the information associated with the document may indicate location information, such as physical location information or virtual location information, and identifying the collaborative similarity may be based on location proximity.

In some implementations, information associated with a document may include physical location information, such as address information, geo-location information, or any location capable of identifying a physical location. For example, a user device may include a geo-location device, such as a global positioning system (GPS) unit, and the information associated with the document may include physical location information indicating the physical location of the user device at the time the document was created, accessed, or modified. In some implementations, the physical location information may be based on user input. For example, a user may input a physical location, or may input information to augment geo-location information, for example, by checking-in to a location. The physical location information may indicate a location that is in close physical proximity with location information associated with another document. In some implementations, the networked application may identify a collaborative similarity based on a comparison of a difference between the physical location information associated with the documents and a threshold value, such as a minimum location difference, a maximum location difference, or an average location difference.

For example, a student may create a document to take notes in a class, and the document may be associated with a location indicator indicating a physical location of the class. Another student may create another document to take notes for the class, and the second document may be associated with another location indicator indicating a similar physical location. The server may identify a collaborative similarity based on a determination that the difference between the first location indicator and the second location indicator is less than a maximum location difference threshold.

In some implementations, the information associated with a document may include virtual location information, such as a network address, a domain, a sub-domain, a universal resource indicator (URI), a social network, a telephone number, or any other information capable of identifying, or partially identifying, an electronic location. For example, a user device may be associated with an IP address, and the virtual location information may include the IP address, or part of the IP address, such as a domain or sub-domain, or may include a URI or part of a URI associated with the IP address or part of the IP address. In some implementations, the virtual location information may be based on user input. For example, a user may create, access, or modify a document and may input virtual location information, or information to augment other virtual location information. The virtual location information may indicate a virtual location that is in close virtual proximity with a virtual location associated with another document. For example, the virtual location information may include a sub-domain of a user device that matches a subdomain associated with another document.

For example, a student may create a document to take notes in a virtual class, and the document may be associated with a virtual location indicator indicating a virtual location of the class. Another student may create another document to take notes for the class, and the second document may be associated with another virtual location indicator indicating a similar virtual location. The server may identify a collaborative similarity based on the similarity between the first virtual location indicator and the second virtual location indicator.

In some implementations, the information associated with a document may indicate contextual information, and identifying the collaborative similarity may be based on contextual proximity. The information associated with the document may be directly associated with the document, for example, stored with the document, or indirectly associated with the document, for example, stored in an external system. The contextual information may include information indicating an event or situation and may be identified based on user input, based on other information associated with the document, or based on a combination of user input and other associated information. For example, the contextual information may indicate an event based on a combination of temporal information associated with the event, location information associated with the event, and user input information indicating the event, such as a check-in. A collaborative similarity may be identified based on contextual proximity between contextual information associated with a document and contextual information associated with another document. For example, the contextual information associated with a document may indicate an event or a situation that is similar to an event or situation associated with another document. In some implementations, the networked application may request user input to augment or confirm contextual relationship information.

For example, a student may create a document to take notes at a lecture, and the document may be associated with a contextual indicator indicating the lecture as a context for the document. Another student may create another document to take notes for the lecture, and the second document may be associated with another contextual indicator indicating the lecture. The server may identify a collaborative similarity based on the similarity between the first contextual indicator and the second contextual indicator.

In some implementations, the information associated with a document may indicate relationship information, such as organizational relationship information, contextual relationship information, or interpersonal relationship information, and the collaborative similarity may be identified based on the relationship information.

In some implementations, organizational relationship information may indicate that a document is associated with an organization, such as a business, a school, a class, a union, a guild, a club, a social network, or any other group or organization. For example, the organizational relationship information may indicate that that a user created, accessed, or modified the first document, and that the user may be a member of an organization. The organizational relationship information associated with a document may indicate an organization that is in close organizational proximity to an organization associated with another document, and the contextual similarity may be based on the organizational proximity. Close organizational proximity may indicate that the organizations are the same organization, such as a company, or that the organizations are members of an organizational hierarchy, such as two colleges within a university.

For example, a user may create a document to take notes at a meeting, and the document may be associated with an organizational relationship indicator indicating that the meeting is associated with an organization, such as a business. Another meeting attendee may create another document to take notes for the meeting, and the second document may be associated with an organizational relationship indicator indicating the organization. The server may identify a collaborative similarity based on a similarity between the organizational relationship indicators.

In some implementations, contextual relationship information may indicate that a document is associated with contextual information that indicates a context, such as a concert, that is associated with another context, such as another concert in a series of concerts. A collaborative similarity may be identified based on a contextual relationship between a context associated with a document and a context associated with another document. For example, contextual information associated with a document may indicate an event or a situation and contextual relationship information may indicate that the event or situations is related to or associated with another event or situation that is associated with another document.

For example, a student may create a document to take notes at a lecture, and the document may be associated with a contextual relationship indicator indicating that the lecture is associated with one or more other lectures, such as in a lecture series. Another student may create another document to take notes for another lecture associated with the lecture series, and the second document may be associated with a contextual relationship indicator indicating the lecture series. The server may identify a collaborative similarity based on a similarity between the contextual relationship indicators.

The contextual relationship information may be explicit or implicit. For example, the server may store explicit information that indicates that a document is associated with an event that is associated with one or more other events. In another example, the server may store information that indicates that a document is associated with an event, and the server may identify implicit information indicating a relationship, or a potential relationship, between the event and another event. In another example, the server may store other information associated with a document, such as temporal and location information, may identify an association between the document and an event based on the other information, and may identify a relationship, or potential relationship, between the event an another event. In some implementations, the server may request user input to augment or confirm contextual relationship information.

In some implementations, interpersonal relationship information may implicitly or explicitly indicate a previous or current relationship related to a document. For example, implicit interpersonal relationship information may indicate that a user associated with the document interacted with another user, such as via e-mail communication, instant messaging, or via a social network. In another example, explicit interpersonal relationship information may explicitly indicate a relationship between a user associated with the document and another entity, such as another person or an organization. For example, explicit interpersonal relationship information may be based on a contacts list or electronic address book.

For example, a user may create a document, and the document may be associated with information indicating the user. Another user may create another document, and the second document may be associated with the second user. The networked application may identify an interpersonal relationship between the first user and the second user based on, for example, e-mail messages exchanged between the users. In some implementations, the networked application may store an interpersonal relationship indicator associated with the first document, the second document, or both. The networked application may identify a collaborative similarity based on the interpersonal relationship.

Referring to FIG. 4, the networked application, or a portion of the networked application, such as the server portion, may verify permissions based on the identified collaborative similarity at 440. For example, the identified collaborative similarity may indicate the first document and a second document and verifying permissions based on the identified collaborative similarity may include determining whether the second document or a user associated with the second document is associated with an indication that collaboration is allowed or that collaboration is disallowed. In some implementations, verifying permissions based on the identified collaborative similarity may include determining whether information associated with the second document may be used for automated collaboration. In some implementations, permissions may be verified for a user that is not associated with a document. For example, permissions may be verified for a user when the networked application is instantiated, which may be before a document is created, accessed, or modified.

The networked application may indicate a collaborative suggestion at 450. Indicating the collaborative suggestion may include presenting the collaborative suggestion to one or more users. For example, the collaborative similarity identified at 430 may indicate a first user device associated with the first document and a second user device associated with a second document, the server may send information indicating the collaborative suggestion to the first user device, and the first user device may present the collaborative suggestion to a user of the first user device. In some implementations, the server may concurrently send information indicating the collaborative suggestion to the second user device, and the second user device may present the collaborative suggestion to a user of the second user device. In some implementations, indicating the collaborative suggestion may include requesting user input. For example, indicating the collaborative suggestion may include requesting an acceptance or rejection of the collaborative suggestion from one or more users.

In some implementations, indicating the collaborative suggestion may include indicating information based on some or all of the information used for identifying the collaborative similarity at 430. For example, a collaborative similarity between a first document and a second document may be identified based on content similarity and location proximity, and indicating the collaborative suggestion to a device associated with the first document may include indicating that the collaborative suggestion is based on content similarity and location proximity, without indicating content or location information associated with the second document, and indicating the collaborative suggestion to a device associated with the second document may include indicating that the collaborative suggestion is based on content similarity and location proximity, without indicating the content or location information associated with the first document.

A collaboration session may be initiated at 460. In some implementations, a collaborative session may be initiated in response to an acceptance of the collaboration suggestion. In some implementations, initiating a collaboration session may include indicating collaboration information, such as the information used for identifying the collaborative similarity at 430, for example. For example, the collaborative similarity may be based on content similarity between two or more documents (the source documents), and initiating a collaboration session may include highlighting, or otherwise indicating, the similar content. The similar content may be indicated in each of the documents, or the similar content may be presented in a collaboration document. In some implementations, differences between the source documents may be highlighted, or otherwise indicated. Indicating the collaboration information may include presenting the collaboration information to one or more users associated with the collaboration session.

In some implementations, initiating a collaboration session may include merging content from one or more documents. For example, content from a first document may be merged into a second document, and content from the second document may be merged into the first document.

In some implementations, initiating a collaboration session may include generating a collaboration document. For example, content from each of the source documents may be merged into a collaboration document, which may be a new document. The collaboration document may include some or all of the content from the source documents. For example, the collaboration document may include content that is similar in each of the source documents or the collaboration document may include content that is similar and content that is not similar, and the similar content may be highlighted, or otherwise indicated. In some implementations, generating a collaboration document may include merging content. For example, the collaboration document may include content form a first document, and may indicate that the content from the first document is similar to content from another document. The collaboration document may be presented to one or more of the users associated with the collaborative session.

Figure 6:
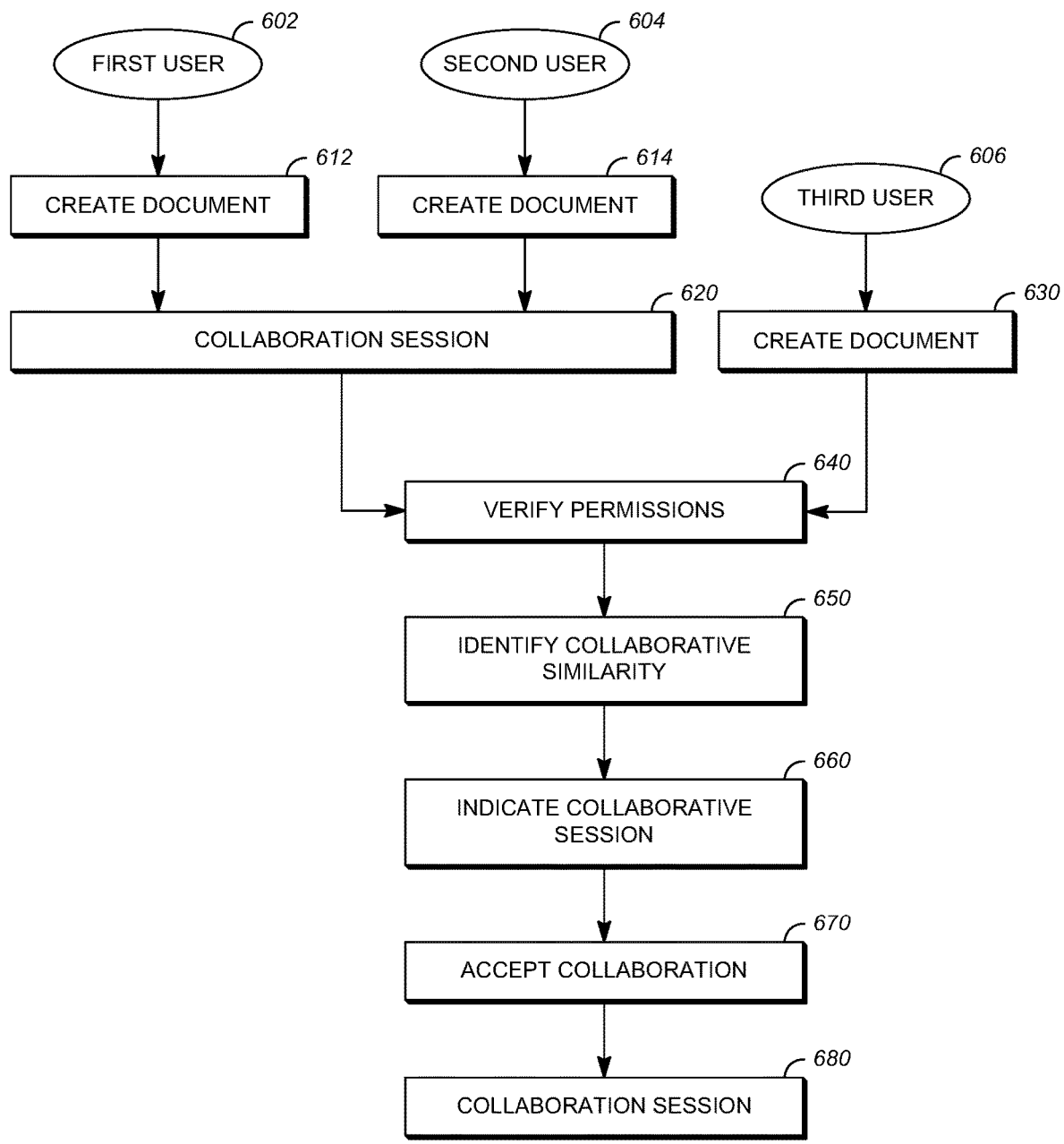
FIG. 6 is a block diagram of automated collaboration with an existing collaboration session in accordance with implementations of this disclosure.

FIG. 6 is a block diagram of automated collaboration with an existing collaboration session in accordance with implementations of this disclosure. In some implementations, additional documents or users may join an existing collaboration session. For example, a first student 602 may create a first document to take notes in a class at 612 and a second student 604 may create a second document to take notes in the class at 614. A collaborative similarity may be identified between the documents and a collaborative session may be performed at 620. For example, the collaborative session may be identified and performed as shown in FIG. 4.

A third student 606 may create a third document to take notes in the class at 630 and the server may determine whether permissions allow automated collaboration for each student and each document at 640. For example, the permissions for the first student may allow automated collaboration with the second student, but may not allow automated collaboration with the third student.

The permissions may allow automated collaboration and the server may identify a collaborative similarity between the third document and one or more documents associated with the collaboration session, such as a collaboration document, at 650. A collaboration suggestion may be indicated to the first student, the second student, third student, or a combination thereof at 660. The students may accept the collaboration suggestion at 670, and the third student may be added to the collaboration session at 680. Adding the third student to the collaboration session may include merging content from the third document with content from one or more documents associated with the collaboration session.

Although not shown in FIGS. 4-6, in some implementations, automated collaboration may include tuning. Tuning may include adjusting the collaboration metrics, threshold values, metric weights, or a combination thereof, to improve the accuracy of collaborative similarity identification. For example, a relatively high content similarity threshold, whereby collaboration similarities are identified for exact and near exact matching documents, may be adjusted to a lower value, such that collaboration similarities are identified for documents that are similar but are not exact or near exact matching documents.

In some implementations, identification of a collaborative similarity may be initiated in response to user input. For example, a user may instantiate the networked application, may create a new document, and may input the text into the document. The user may input a request to identify collaborative similarities or to initiate a collaborative session, and the networked application, or a portion of the networked application, such as the server portion, may identify, or attempt to identify, a collaborative similarity. In some implementations, a user may initiate automated collaboration to find potential collaborators or to detect potential plagiarism.

Other implementations of the diagram of automated collaboration as shown in FIGS. 4-6 are available. In implementations, additional elements of automated collaboration can be added, certain elements can be combined, and/or certain elements can be removed. For example, in some implementations, verifying permissions at 420 (or 440) can be skipped and/or omitted.

Automated collaboration, or any portion thereof, can be implemented in a device, such as the computing device 100 shown in FIG. 1. For example, a processor, such as the processor 140 shown in FIG. 1, can implement automated collaboration, or any portion thereof, using instruction, such as the instructions 160 shown in FIG. 1, stored on a tangible, non-transitory, computer readable media, such as the memory 150 shown in FIG. 1.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in FIGS. 1-3.

Further, for simplicity of explanation, although the figures and descriptions herein may include sequences or series of steps or stages, elements of the methods disclosed herein can occur in various orders or concurrently. Additionally, elements of the methods disclosed herein may occur with other elements not explicitly presented and described herein. Furthermore, not all elements of the methods described herein may be required to implement a method in accordance with the disclosed subject matter.

The implementations of the computing and communication devices (and the algorithms, methods, or any part or parts thereof, stored thereon or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the computing and communication devices do not necessarily have to be implemented in the same manner.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A method for suggesting collaboration between a plurality of users of a communication system, the method comprising:
   identifying, by a processing device, a first document pertaining to a first event, the first document associated with a first user of the plurality of users;
   determining whether collaboration is allowed for the first document;
   responsive to determining that the collaboration is allowed for the first document, identifying, by the processing device, a second document having a collaborative similarity with the first document, the second document pertaining to a second event and associated with a second user of the plurality of users, the collaborative similarity being identified based on how similar the first event is to the second event, and additional information associated with the first document and the second document, the additional information comprising information about the second user and temporal information indicating temporal proximity between the first event and the second event, the temporal information comprising first time data of the first document and second time data of the second document;
   responsive to identifying the second document having the collaborative similarity with the first document, generating, by the processing device, a collaboration suggestion for collaboration between the first user and the second user with respect to the first event;
   providing, by the processing device, the collaboration suggestion to collaborate with respect to the first event on a user device of the first user;
   receiving, by the processing device, an indication of an acceptance, by the first user, of the collaboration suggestion; and
   causing a collaboration session to be established between the user device of the first user and a user device of the second user to collaborate with respect to the first event.

2. The method of claim 1, wherein the collaboration allowed for the first document comprises at least one of concurrent viewing or concurrent editing of content of the first document by the first user and at least one other user of the plurality of users.

3. The method of claim 1, wherein identifying the second document having the collaborative similarity with the first document comprises:
   determining whether a collaboration metric for measuring a similarity between the first document and the second document meets a threshold value.

4. The method of claim 3, wherein the similarity is one or more of a contextual information similarity, a temporal similarity, a location similarity, a document similarity, or a user similarity.

5. The method of claim 3, further comprising:
   applying a weight to the threshold value based on the collaboration metric.

6. The method of claim 5, further comprising:
   adjusting one or more of the collaboration metric, the threshold value, or the weight.

7. The method of claim 1, wherein the collaboration session comprises a third document created based on the first document and the second document.

8. The method of claim 7, wherein the third document is one of a word processing document, a spreadsheet document, or a presentation slide document.

9. A system comprising:
   a memory; and
   a processing device, coupled to the memory, to perform operations comprising:
      identifying a first document pertaining to a first event, the first document associated with a first user of a plurality of users of a communication system;
      determining whether collaboration is allowed for the first document;
      responsive to determining that the collaboration is allowed for the first document, identifying a second document having a collaborative similarity with the first document, the second document pertaining to a second event and associated with a second user of the plurality of users, the collaborative similarity being identified based on how similar the first event is to the second event, and additional information associated with the first document and the second document, the additional information comprising information about the second user and temporal information indicating temporal proximity between the first event and the second event, the temporal information comprising first time data of the first document and second time data of the second document;
      responsive to identifying the second document having the collaborative similarity with the first document, generating a collaboration suggestion for collaboration between the first user and the second user with respect to the first event;
      providing the collaboration suggestion to collaborate with respect to the first event on a user device of the first user;
      receiving an indication of an acceptance, by the first user, of the collaboration suggestion; and
      causing a collaboration session to be established between the user device of the first user and a user device of the second user to collaborate with respect to the first event.

10. The system of claim 9, wherein the collaboration allowed for the first document comprises at least one of concurrent viewing or concurrent editing of content of the first document by the first user and at least one other user of the plurality of users.

11. The system of claim 9, wherein identifying the second document having the collaborative similarity with the first document comprises:
   determining whether a collaboration metric for measuring a similarity between the first document and the second document meets a threshold value.

12. The system of claim 11, wherein the similarity is one or more of a contextual information similarity, a temporal similarity, a location similarity, a document similarity, or a user similarity.

13. The system of claim 11, the operations further comprising:
   applying a weight to the threshold value based on the collaboration metric.

14. The system of claim 13, the operations further comprising:
   adjusting one or more of the collaboration metric, the threshold value, or the weight.

15. The system of claim 9, wherein the collaboration session comprises a third document created based on the first document and the second document.

16. The system of claim 15, wherein the third document is one of a word processing document, a spreadsheet document, or a presentation slide document.

17. A non-transitory computer readable medium comprising instructions, which when executed by a processing device, cause the processing device to perform operations comprising:
- identifying a first document pertaining to a first event, the first document associated with a first user of a plurality of users of a communication system;
- determining whether collaboration is allowed for the first document;
- responsive to determining that the collaboration is allowed for the first document, identifying a second document having a collaborative similarity with the first document, the second document pertaining to a second event and associated with a second user of the plurality of users, the collaborative similarity being identified based on how similar the first event is to the second event, and additional information associated with the first document and the second document, the additional information comprising information about the second user and temporal information indicating temporal proximity between the first event and the second event, the temporal information comprising first time data of the first document and second time data of the second document;
- responsive to identifying the second document having the collaborative similarity with the first document, generating a collaboration suggestion for collaboration between the first user and the second user with respect to the first event;
- providing the collaboration suggestion to collaborate with respect to the first event on a user device of the first user;
- receiving an indication of an acceptance, by the first user, of the collaboration suggestion; and
- causing a collaboration session to be established between the user device of the first user and a user device of the second user to collaborate with respect to the first event.

18. The non-transitory computer readable medium of claim 17, wherein the collaboration allowed for the first document comprises at least one of concurrent viewing or concurrent editing of content of the first document by the first user and at least one other user of the plurality of users.

19. The non-transitory computer readable medium of claim 17, wherein identifying the second document having the collaborative similarity with the first document comprises:
- determining whether a collaboration metric for measuring a similarity between the first document and the second document meets a threshold value.

20. The non-transitory computer readable medium of claim 19, wherein the similarity is one or more of a contextual information similarity, a temporal similarity, a location similarity, a document similarity, or a user similarity.

* * * * *